Patented July 18, 1950

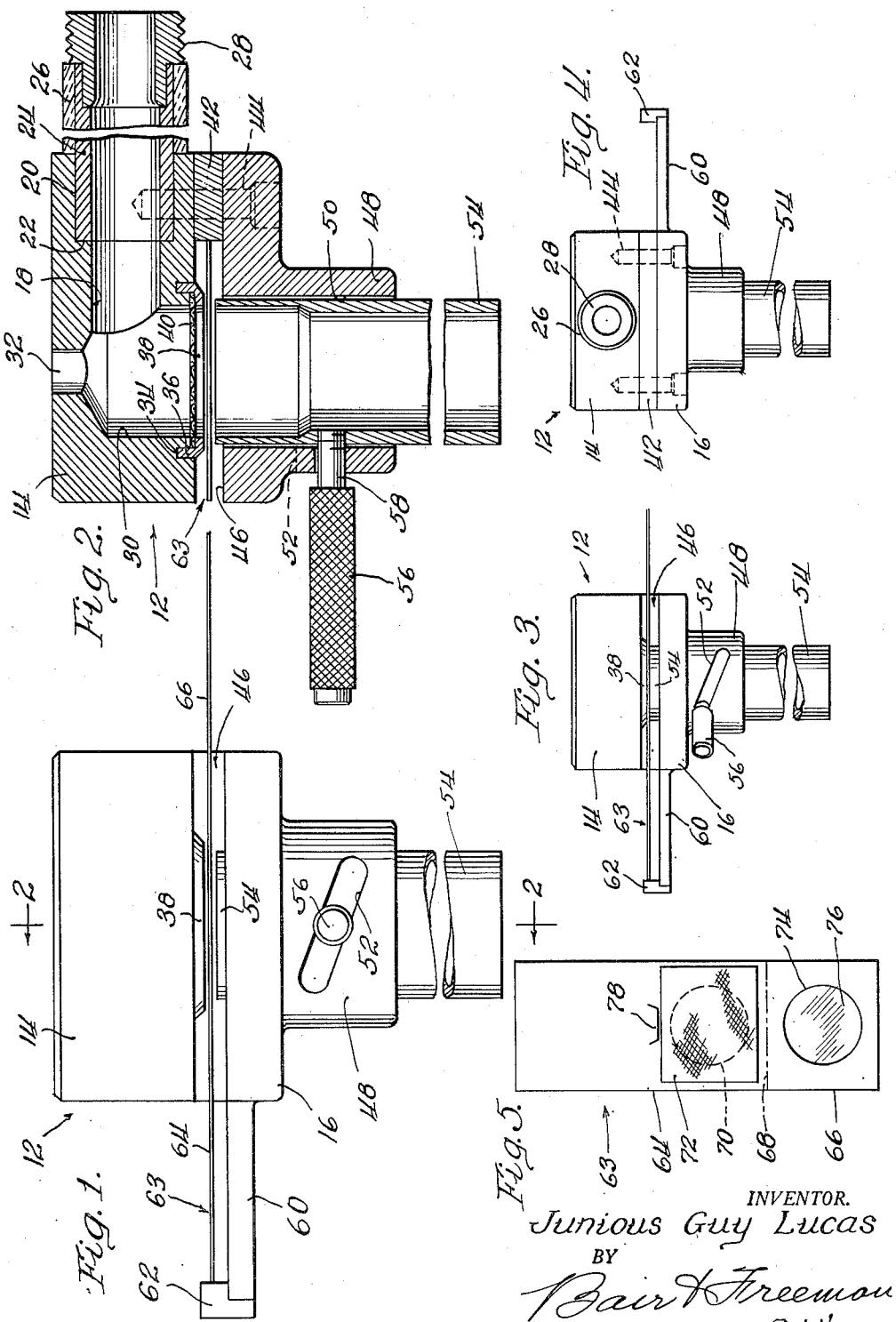

2,515,522

UNITED STATES PATENT OFFICE 2,515,522

SEDIMENT TEST GUN

Junious Guy Lucas, Madrid, Iowa

Application October 24, 1947, Serial No. 781,886

8 Claims. (Cl. 73—61)

This invention relates to sediment test guns, for use in connection with test cards, for obtaining specimens of material to be tested and depositing same on the cards.

The process in which the device of the present invention is employed relates generally to testing milk and cream, although the device is equally applicable to other materials, i. e., any liquid material containing solid matter, a specimen of which is to be examined. When the term "milk" is used herein, it is intended to include any liquid which is to be tested. In using the device, a quantity of milk is strained through a filter element, and sediment in the milk is deposited on the filter where it can be examined.

An objection to former methods of testing milk is that it was difficult to procure the deposit of sediment on the filter element which in most cases is small and hard to handle.

Another objection to former methods generally in use is that even after the sediment is deposited on the filter element, the operator is required to attach the filter element to a test card, which enables the operator to put the card away for future record.

An object of the present invention is to overcome the above-noted objections to former devices and methods.

A more specific object of the present invention is the provision of a sediment test gun, effective for depositing sediment from milk onto a filter element which is formed as a unitary part of a test card.

Another object is the provision of a test gun into which a filter can be quickly inserted and quickly removed.

A further object is the provision of a test gun by means of which, after a filter is in place therein, a test specimen can be quickly obtained.

A still further object of the invention is the provision of a test gun, in which a filter can be inserted, adapted for production of a vacuum therein for drawing the material to be tested through the filter.

Another object is the provision of such a test gun which is effective for obtaining specimens from various containers by inserting the gun into the material in the containers.

Still another object is the provision of a test gun which is small and portable and easily manipulated by an operator.

With these and other objects in view, my invention consists in the construction, arrangement, and combination of the various parts of my device whereby the objects contemplated are attained, as hereinafter more fully set forth, pointed out in my claims, and illustrated in the accompanying drawings, wherein:

Figure 1 is a front elevational view of the sediment test gun of the present invention;

Figure 2 is a vertical sectional view taken on line 2—2 of Figure 1;

Figure 3 is a view on a reduced scale similar to Figure 1, but showing the test card clamped in position;

Figure 4 is a rear view of the device; and

Figure 5 is a view on a reduced scale of a test card for use with the test gun.

The test gun of Figures 1 to 4

Referring in detail to the drawings, the test gun, of the embodiment of the invention illustrated in Figures 1 to 4, includes a body 12 made up of an upper part 14 and a lower part 16, both of which may be die castings. The upper part 14 is provided with a horizontal passage 18 opening outwardly of the rear thereof in an enlargement 20 which forms a shoulder 22. A pipe or conduit 24 is press fitted into the enlargement 20 and seats against the shoulder 22. The pipe 24 is preferably of a convenient length to form a handle for holding and manipulating the test gun. A sleeve 26 of heat insulating material is fitted over the pipe 24 for protecting the operator's hand in the use of the device. A nipple 28 is press fitted into the outer end of the pipe 24, and is provided with an enlarged outer portion exteriorly threaded for connection, by means of a flexible tube, with a container (not shown) in which a vacuum may be produced and into which the milk or other liquid being tested flows after flowing through the gun and a specimen is obtained.

The upper part 14 of the body 12 is also provided with a larger vertical passage 30 communicating with the passage 18 and opening downwardly out of the part. A vent 32 communicates with the passage 30 and opens upwardly out of the upper part 14, in position for the operator to close it with his thumb while holding the device by the pipe 24 or handle. If desired, a valve may be employed in the gun, having an exterior thumb-operated extension, for closing off the flow of milk, or other liquid, and preventing the destruction of the vacuum in the container.

The lower surface of the upper part 14 of the body 12 is formed with an annular recess 34 surrounding the opening of the vertical passage 30, for the reception, by means of a press fit, of the axial flange 36 of the sealing ring 38 having a central opening in register with the passage 30. A screen 40 is interposed between the sealing ring 38 and the lower surface of the upper part 14, and thereby covers the passage 30. The sealing ring 38 extends slightly below the lower surface of the upper part and the lower surface of the ring forms a sealing surface. The sealing surface of the ring 38, while preferably being circular, may be of a modified shape and the term "annular" is intended to include all shapes of rings which surround the passage 30.

A spacer 42 is interposed between the upper part 14 and the lower part 16 of the body, adjacent the rear edge thereof, and the two parts are secured together by screws 44, disposed on either side of the horizontal passage 18. The spacer 42 therefore forms a slot 46 between the parts 14 and 16 of the body, and it will be noted that the bottom sealing surface of the sealing ring 38 is disposed in the area of the slot. The slot 46 opens out of the body on the sides and front, the back side being closed by the spacer 42 which extends thereacross.

The lower part 16 of the body is formed with a depending tubular portion 48, and a vertical passage or bore 50 in register with the passage 30. The front wall of the tubular portion 48 is provided with an inclined cam slot 52.

A pipe or pick-up tube 54 is loosely mounted in the passage 50 and secured therein by a handle 56 having a reduced threaded portion 58 extending through the cam slot 52 and threaded into the pipe. On sliding the handle 56 in the cam slot 52, the pick-up tube 54 is moved up and down to a limited extent. On upward movement of the pick-up tube, the upper end thereof extends into the slot 46 and into engagement with the bottom sealing surface of the sealing ring 38.

A horizontal arm 60 is secured to the lower part 16 of the body, in such a position that the upper surface of the arm is substantially flush with the lower surface of the slot 46. Secured to the outer end of the arm 60 is an upstanding stop 62.

Figure 5 illustrates a novel sediment test card particularly adaptable to the test gun of the present invention. This test card forms the subject matter of my copending application, Serial No. 781,387, filed October 24, 1947, to which reference may be had for complete details thereof; but a brief description of the test card is here given to illustrate the function of my novel test gun.

The test card 62 of Figure 5 is made of paper or light cardboard, and is illustrated with its front face toward the observer. The card comprises a main section 64 and a foldable section 66 hinged thereto, at a hinge line 68 which may be a scored or weakened line in the card. A hole 70 is cut in the main section 64 adjacent the hinge line 68. A filter element or member 72 is adhesively secured to the main section and disposed over the hole 70. Cut in the foldable section 66 is a sight opening 74, of a size and shape similar to the hole 70, the sight opening being covered by a flexible transparent material 76 secured to the foldable section around the sight opening on either side as desired, of the foldable section. A tongue 78 is stamped from the main section 64 adjacent the filter element or member 72 and is adapted to receive the free or swinging end of the foldable section 66 when the latter is folded over the filter element. When the foldable section is so folded, the sight opening 74 is substantially in register with the hole 70.

In operation of the device, the pipe 24 is connected by means of a flexible tube to a container in which a vacuum is produced as above mentioned. The handle 56 is manipulated to retract the pick-up tube 54 downwardly out of the slot 46; the card 63 is then inserted in the slot with its front face down and its upper end (as viewed in Figure 5) extended to the left and abutting the stop 62. In this position of the card, the hole 70 with the filter thereover is in register with the passage 30 and the pick-up tube 54. The handle 56 is then slid in the cam slot 52 to move the pick-up tube 54 upwardly and its upper end into engagement with the test card, the test card thereby being firmly secured between the upper end of the pick-up tube 54 and the bottom sealing surface of the sealing ring 38. When this has been done, the pick-up tube 54, which may be of any convenient length, is inserted in the milk to be tested.

The means for producing vacuum is preferably operating continuously, and the operator closes the vent 32 with his thumb; reduced pressure then results in the passages 18 and 30 and the pick-up tube 54, drawing milk therethrough and through the filter element 72. The screen 40 acts as a support for the filter which might, except for the screen, be ruptured by the force of the milk flowing therethrough. The device is thereafter withdrawn from the milk, and the card removed from the device after first retracting the pick-up tube 54 downwardly.

Sediment that may be in the milk is deposited on the filter, which can then be examined. The foldable section 66 of the card is folded over the filter and locked under the tongue 78, after which the card is put away for record.

The term "vacuum" as used herein is intended to mean any pressure below atmospheric pressure.

It will be understood that the slot 46 is for the purpose of enabling an operator to place a test card between the respective sealing surfaces, but other arrangements may be used, such as an open framework for mounting and securing the elements together by means of which a test card can be inserted, and in the latter case a slot as such may not exist but may be an opening or aperture.

Obviously, a separate filter, detached from the test card, can be employed in the device, if desired, and later placed on the card.

It will thus be seen that the present invention, as exemplified, is effective for quickly and efficiently testing milk for sediment. The present invention, together with my new test card eliminates inconvenient and time consuming methods heretofore in use.

While I have herein shown and described a preferred embodiment of my invention, manifestly it is susceptible of modification and rearrangement of the parts without departing from the spirit and scope thereof. I do not, therefore, wish to be understood as limiting my invention to the precise form herein disclosed, except as I may be so limited by the appended claims.

I claim as my invention:

1. A portable sediment test gun comprising, in combination, a body member having a slot formed therein, said body member being provided with an interior space having a passage disposed perpendicular to said slot and opening thereinto, an annular sealing surface formed on said body member in said slot and surrounding said passage, a tubular member secured in said body member communicating with said interior space and serving as a handle, said tubular member, being adapted for connection with a receptacle in which vacuum can be produced and propagated through said tubular member into said interior space, and a second tubular member mounted in said body member, said second tubular member having one end thereof movable perpendicularly into and out of said slot and into and out of engagement with said sealing surface, said second tubular member forming a passage communicating with said interior space, said end of said second tubular member and said sealing surface being adapted to removably secure a filter member therebetween said second tubular member being adapted for insertion into a liquid, whereby vacuum produced in said receptacle produces relative pressure on the liquid which forces the liquid through said second tubular member, through said filter member, and into said interior space and through said first tubular member.

2. A portable sediment test gun comprising, in combination, a body member having a slot formed therein, said body member being provided with an interior space having a passage disposed perpendicular to said slot and opening thereinto, an annular sealing surface formed on said body member in said slot and surrounding said passage, a tubular member secured in said body member communicating with said interior space and serving as a handle, and a rotatable tubular member mounted in said body member, said body member having an inclined cam slot formed therein, an operating lever secured to said rotatable tubular member and extending through said cam slot, said rotatable tubular member having one end in register with and adapted to move into sealing engagement with said annular sealing surface, said lever being adapted, on actuation thereof by an operator, for sliding in said cam slot and thereby rotating said rotatable tubular element and move said end into and out of sealing engagement with said sealing surface, said rotatable tubular member and said sealing surface being adapted to secure a filter element therebetween, said rotatable member being adapted for insertion into a liquid, whereby pressure when exerted on the liquid forces the liquid through the rotatable tubular member, filter element, interior space, and handle tubular member.

3. A portable sediment test gun comprising, in combination, a body member having a slot formed therein, said body member being provided with an interior space having a passage disposed perpendicular to said slot and opening thereinto, an annular sealing surface formed on said body member in said slot and surrounding said passage, a transverse arm secured to said body member and having a surface in register with one of the surfaces of said slot, stop means on the extended end of said arm, a tubular member secured in said body member communicating with said interior space and serving as a handle, and a rotatable tubular member mounted in said body member, said body member having an inclined cam slot formed therein, an operating lever secured to said rotatable tubular member and extending through said cam slot, said rotatable tubular member having one end in register with and adapted to move into sealing engagement with said annular sealing surface, said lever being adapted, on actuation thereof by an operator, for sliding in said cam slot and thereby rotating said rotatable tubular element and moving said end into and out of sealing engagement with said sealing surface, said slot being adapted to receive therein a test card having a filter element thereon, said stop means cooperating with said test card for positioning said filter element thereon in position between said annular sealing surface and said end of said rotatable tubular element, said rotatable tubular member and said sealing surface being adapted to secure said filter element therebetween, said rotatable member being adapted for insertion into a liquid, whereby pressure when exerted on the liquid forces the liquid through the rotatable tubular member, filter element, interior space, and handle tubular member.

4. A portable sediment test gun comprising, in combination, a body member having a slot formed therein, said body member being provided with an interior space having a passage disposed perpendicular to said slot and opening thereinto, an annular sealing surface formed on said body member in said slot and surrounding said passage, a screen secured in said passage and extending transversely thereacross adjacent said sealing surface, a tubular member secured in said body member communicating with said interior space and serving as a handle, and a rotatable tubular member mounted in said body member, said body member having an inclined cam slot formed therein, an operating lever secured to said rotatable tubular member and extending through said cam slot, said rotatable tubular member having one end in register with and adapted to move into sealing engagement with said annular sealing surface, said lever being adapted, on actuation thereof by an operator, for sliding in said cam slot and thereby rotating said rotatable tubular element and move said end into and out of sealing engagement with said sealing surface, said rotatable tubular member and said sealing surface being adapted to secure a filter element therebetween, said rotatable member being adapted for insertion into a liquid, whereby pressure when exerted on the liquid forces the liquid through the rotatable tubular member, filter element, interior space, and handle tubular member.

5. A portable sediment test gun comprising, in combination, a body member having a slot formed therein, said body member being provided with an interior space having a passage disposed perpendicular to said slot and opening thereinto, a vent in said body communicating between said passage and atmosphere, an annular sealing surface formed on said body member in said slot and surrounding said passage, a transverse arm secured to said body member and having a surface in register with one of the surfaces of said slot, stop means on the extended end of said arm, a tubular member secured in said body member communicating with said interior space and serving as a handle, and a rotatable tubular member mounted in said body member, said body member having an inclined cam slot formed therein, an operating lever secured to said rotatable tubular member and extending through said cam slot, said rotatable tubular member having one end in register with and adapted to move into sealing engagement with said annular sealing surface, said lever being adapted, on actuation thereof by an operator, for sliding in said cam slot and thereby rotating said rotatable tubular element and move said end into and out of sealing engagement with said sealing surface, said slot being adapted to receive therein a filter test card having a filter element thereon, said stop means cooperating with said test card for positioning said filter element thereon in a position between said annular sealing surface and said end of said rotatable tubular element and in registration with said passage, said rotatable tubular member and said sealing surface being adapted to secure said filter element therebetween, said rotatable member being adapted for insertion into a liquid, whereby pressure when exerted on the liquid forces the liquid through the rotatable tubular member, filter element, interior space, and handle tubular member.

6. A portable test gun comprising, in combination, a body member having an interior space and a tubular member communicating with the interior space and adapted for communication with means for producing vacuum, said tubular member serving as a handle for manipulating the test gun, said interior space having a passage communicating with atmosphere through the under surface of said body member, the under surface of said body member having an annular recess surrounding said passage, a ring received in said recess, a screen secured between said ring and body member and extending across said passage, the under surface of said ring forming an annular sealing surface, a second tubular member adjustably mounted on and carried by said body member and movable so that one end can be brought into and out of engagement with said sealing surface and clamping a filter member therebetween, and means for moving said second tubular member, the other end of said second tubular member being adapted for insertion into a liquid whereby the vacuum is effective for producing relative pressure on the liquid which forces the liquid through the test gun.

7. A portable test gun comprising, in combination, a body member having an interior space and a tubular member communicating with the interior space and adapted for communication with means for producing vacuum, said tubular member serving as a handle for manipulating the test gun, said interior space having a passage communicating with atmosphere through the under surface of said body member, the under surface of said body member having an annular sealing surface, a tubular portion mounted on and below said body member and having an opening in axial alignment with said passage, a second tubular member freely rotatably and slidably mounted in said tubular portion, said tubular portion having an inclined cam slot therein, and a pin secured in said second tubular member extending through and outwardly beyond said cam slot, said pin being operative on actuation thereof for moving said second tubular member so that one end thereof moves into and out of engagement with said sealing surface for clamping a filter member therebetween, the other end of said second tubular member being adapted for insertion into a liquid, and the vacuum being effective for producing relative pressure on the liquid which forces the liquid through the test gun.

8. A portable and movable test gun adapted for manual handling in its operation, comprising, in combination, a body member having an interior space, a first tubular member communicating with said interior space and adapted to be connected by means of a flexible conduit with means for producing vacuum, said body member having a vent communicating with said interior space and opening to atmosphere, said vent being positioned for closure by the finger of the user of the test gun in grasping the handle, said interior space having a passage opening to atmosphere through the under surface of said body member, the under surface of said body member having a sealing surface surrounding said passage, and a second tubular member mounted on and carried by said body member in axial alignment with said passage, said second tubular member being adjustable so that one end is movable into and out of engagement with said sealing surface, whereby a filter member can be clamped between said sealing surface and said one end of said second tubular member, the other end of said second tubular member being adapted for insertion into a liquid, and the vacuum being effective for producing relative pressure on the liquid which forces the liquid through the test gun in response to control of the vacuum by closing said vent.

JUNIOUS GUY LUCAS.

REFERENCES CITED

The following references are of record in the file of this patent:

UNITED STATES PATENTS

| Number | Name | Date |
| --- | --- | --- |
| 1,052,391 | Valerius et al. | Feb. 4, 1913 |
| 1,445,770 | Kendall | Feb. 20, 1923 |
| 1,613,166 | Gregory | Jan. 4, 1927 |
| 1,849,582 | Lundborg | Mar. 15, 1932 |
| 2,099,038 | Shikles | Nov. 16, 1937 |
| 2,177,060 | Drew | Oct. 24, 1939 |
| 2,307,318 | Kinney | Jan. 5, 1943 |